US012565170B2

(12) United States Patent
Ishibashi

(10) Patent No.: US 12,565,170 B2
(45) Date of Patent: Mar. 3, 2026

(54) OCCUPANT PROTECTION DEVICE

(71) Applicant: SUBARU CORPORATION, Tokyo (JP)

(72) Inventor: Kazushige Ishibashi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 19/231,157

(22) Filed: Jun. 6, 2025

(65) Prior Publication Data

US 2026/0014956 A1     Jan. 15, 2026

(30) Foreign Application Priority Data

Jul. 10, 2024     (JP) ................................. 2024-111344

(51) Int. Cl.
  B60R 21/2165     (2011.01)
  B60R 21/00     (2006.01)
  B60R 21/206     (2011.01)
(52) U.S. Cl.
  CPC ........ B60R 21/2165 (2013.01); B60R 21/206 (2013.01); *B60R 2021/0051* (2013.01)
(58) Field of Classification Search
  CPC .............. B60R 21/2165; B60R 21/206; B60R 2021/0051; B60R 2021/0039; B60R 21/20; B60R 21/205; B60R 21/215; B60R 21/2176
  See application file for complete search history.

(56) References Cited

U.S. PATENT DOCUMENTS

2010/0244416 A1* 9/2010 Mitsuo ................ B60R 21/2032
                                                          280/731
2020/0062206 A1* 2/2020 Jacobson ............ B60R 21/2338
2020/0307487 A1* 10/2020 Sherman .............. B60R 21/205

FOREIGN PATENT DOCUMENTS

JP         2023-076851 A      6/2023

* cited by examiner

*Primary Examiner* — Paul N Dickson
*Assistant Examiner* — Matthew Joseph Ganci
(74) *Attorney, Agent, or Firm* — McGinn IP Law Group, PLLC

(57)          ABSTRACT

An occupant protection device includes an airbag, an airbag opening, an airbag door, and an airbag module. The airbag opening is provided in an instrument panel. The airbag passes through the airbag opening when the airbag is inflated and deployed. The airbag door closes the airbag opening and is torn open when the airbag is inflated and deployed. The airbag opening has a first side, a second side, and a third side. The first side and the third side are continuous at a first corner. The second side and the third side are continuous at a second corner. A first rib portion, a second rib portion, and a third rib portion are provided at an edge of each side of the instrument panel. The first rib portion and the third rib portion of the instrument panel are discontinuous. The second rib portion and the third rib portion are discontinuous.

19 Claims, 4 Drawing Sheets

OCCUPANT PROTECTION DEVICE

CROSS-REFERENCE TO RELATED APPLICATIONS

The present application claims priority from Japanese Patent Application No. 2024-111344 filed on Jul. 10, 2024, the entire contents of which are hereby incorporated by reference.

BACKGROUND

The disclosure relates to an occupant protection device.

Many vehicles such as automobiles are equipped with an airbag device for protecting occupants. A top-mounted airbag device for a passenger's seat and a knee airbag device are installed in an instrument panel. An inflator and an airbag are modularized and stored in the airbag device.

When the airbag device senses a collision, an inflation gas is ejected from the inflator. The airbag is inflated and developed between the instrument panel and the occupant by the ejected inflation gas to protect the occupant.

An airbag opening provided in the instrument panel is closed by an airbag door (also referred to as an "airbag grid"). The airbag door is torn by internal pressure when the airbag is inflated and deployed.

The airbag door is attached to the instrument panel with fitting claws. Thus, when the airbag door is torn, pressure is applied to the peripheral edge of the airbag opening through the engagement claw. At this time, if an edge of the airbag opening is bent toward the occupant, the airbag door cannot follow the inflation and deployment of the airbag, and a gap is likely to be generated between the edge of the airbag opening and the airbag door.

When a gap is generated between the edge of the airbag opening and the airbag door, a so-called fish-mouth phenomenon in which the airbag enters the gap may occur.

As a countermeasure against this, for example, Japanese Unexamined Patent Application Publication (JP-A) No. 2023-76851) discloses a technique in which an outer surface of an airbag accommodated in a folded state is covered with a deployment cover. In the technique disclosed in this document, when the airbag is inflated and deployed, the deployment cover is deployed to cover between the peripheral edge of the airbag opening and the airbag outer surface. Thus, the airbag is inflated and deployed in the direction of the occupant, and a deployment failure is prevented.

SUMMARY

An aspect of the disclosure provides an occupant protection device. The occupant protection device includes an airbag, an airbag opening, an airbag door, and an airbag module. The airbag opening is provided in an instrument panel. The airbag is configured to pass through the airbag opening when the airbag is inflated and deployed in a direction of an occupant of a vehicle. The airbag door is configured to close the airbag opening and be torn open when the airbag is inflated and deployed. The airbag module is housed in the airbag door at a portion closer to a front side of a vehicle body of the vehicle and includes the airbag. The airbag opening has a first side, a second side, and a third side. The first side and the second side extend in an upward direction and face each other. The third side extends in a horizontal direction. The first side and the third side are continuous at a first corner. The second side and the third side are continuous at a second corner. A first rib portion, a second rib portion, and a third rib portion are provided at an edge of each of sides of the instrument panel, and the first rib portion, the second rib portion, and the third rib portion extend along each of the sides. The first rib portion and the third rib portion of the instrument panel are discontinuous without intersecting each other on the first corner side. The second rib portion and the third rib portion are discontinuous without intersecting with each other on the second corner side.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

In the technique disclosed in JP-A No. 2023-76851, when the airbag is inflated and deployed to press the airbag door, the peripheral edge of the airbag opening is also pressed. At this time, when the peripheral edge of the airbag opening is bent, the deployment pressure of the airbag is attenuated accordingly, and the deployment delay is likely to occur.

It is desirable to provide an airbag device capable of preventing a deployment delay when an airbag is inflated and deployed.

Hereinafter, an embodiment of the disclosure will be described with reference to the drawings.

First Embodiment

FIGS. 1A to 3B illustrate a first embodiment of the disclosure. In the following description, front, rear, left, and right are based on the vehicle body, and the front and rear correspond to the front and rear direction of the vehicle body, and the left and right correspond to the left and right in the width direction of the vehicle body unless otherwise specified.

Figure 1A:
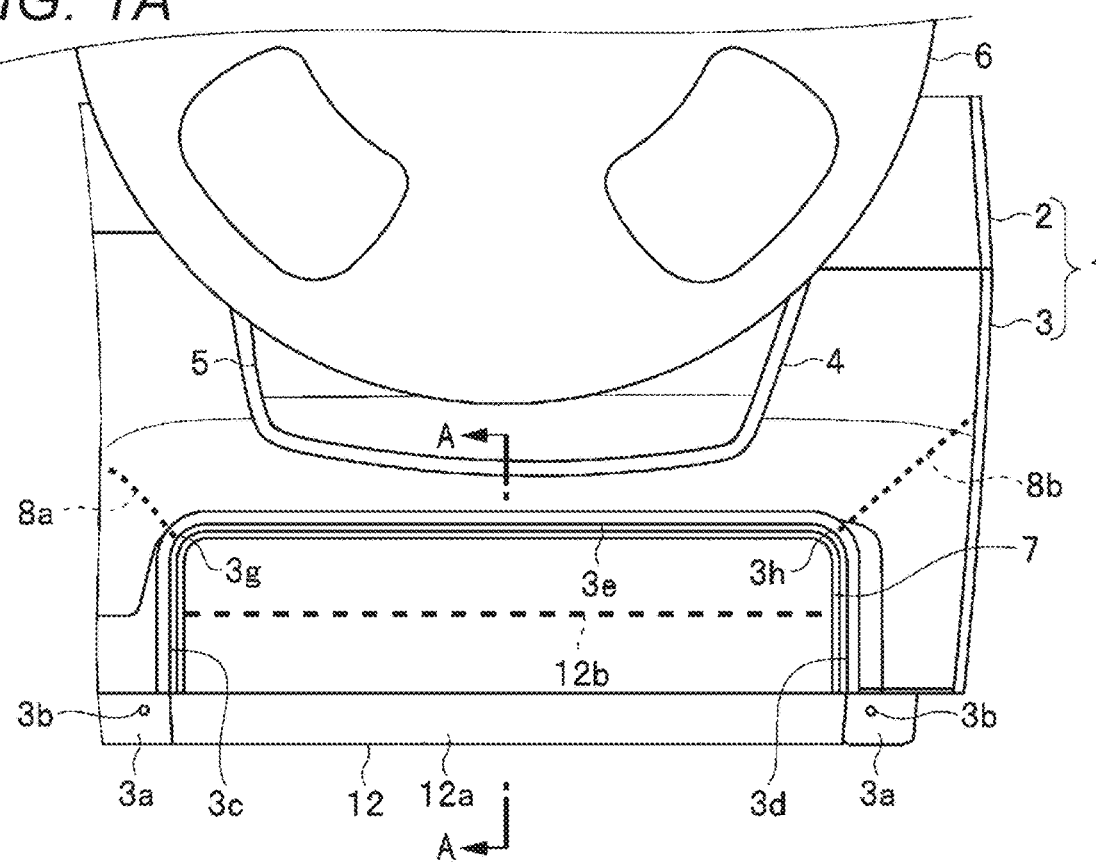
FIG. 1A is a front view of a front of a driver's seat including an occupant protection device according to an embodiment.
Figure 1B:
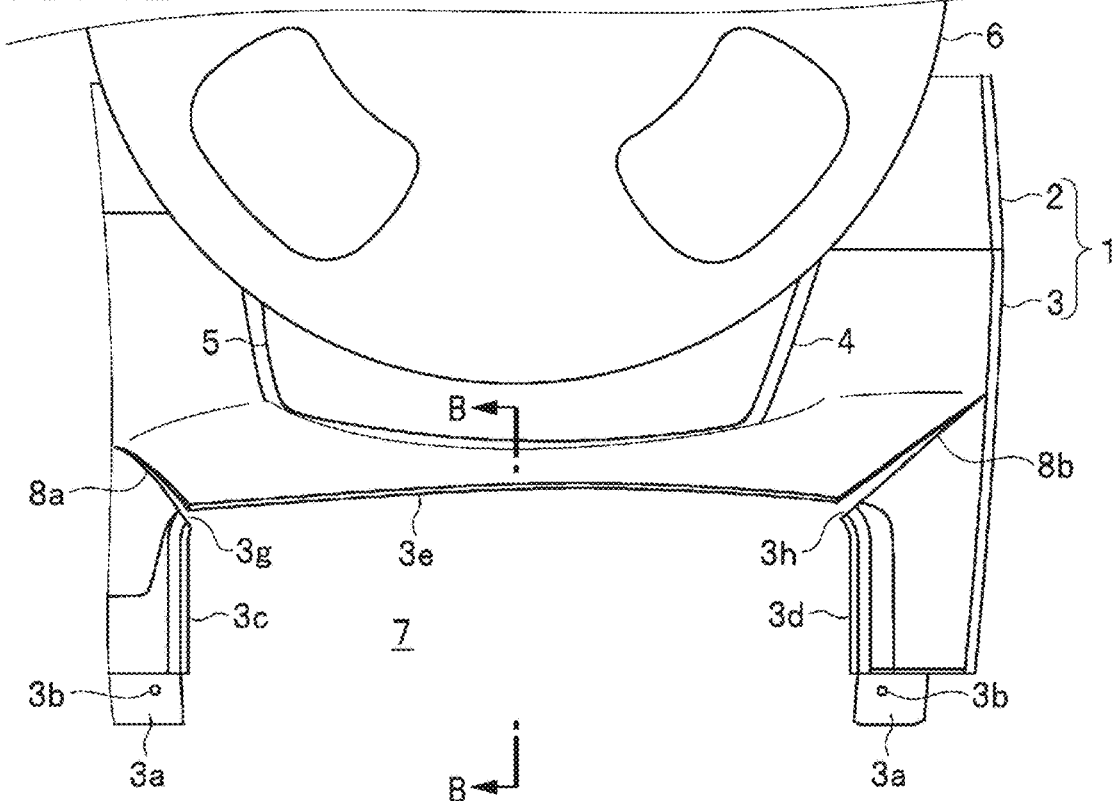
FIG. 1B is a front view illustrating a state in which a lower panel of an instrument panel is folded when the airbag is inflated and developed.

Reference numeral 1 in FIGS. 1A and 1B denotes an instrument panel provided in a vehicle. An occupant protection device that protects an occupant when a vehicle collides is provided on the instrument panel 1.

FIGS. 1A and 1B illustrate an instrument panel 1 in front of a driver's seat. The instrument panel 1 includes an upper panel 2 on an upper side and a lower panel 3 on a lower side. A combination meter (not illustrated) and the like are disposed on the upper panel 2.

A steering column opening 4 is provided in an upper portion of the lower panel 3. A steering column 5 is disposed in the steering column opening 4. A steering shaft (not illustrated) is rotatably supported in the steering column 5. A steering wheel 6 is fixed to an end of the steering shaft protruding from the steering column 5 toward the driver's seat.

An airbag opening 7 is provided in the lower panel 3 located below the steering column opening 4. The lower end of the airbag opening 7 is opened. A seat surface portion 3a is provided at a lower end portion of the lower panel 3 and at left and right edges of the airbag opening 7. A screw insertion hole 3b is drilled in the seat surface portion 3a.

A back surface (vehicle front side) of the seat surface portion 3a is in contact with a reinforcement (not illustrated) on the vehicle body side. The seat surface portion 3a is fastened and fixed to the reinforcement via a screw inserted into the screw insertion hole 3b. This screw is, for example, a tapping screw. The reinforcement has a pilot hole for guiding the tapping screw.

Figure 2:
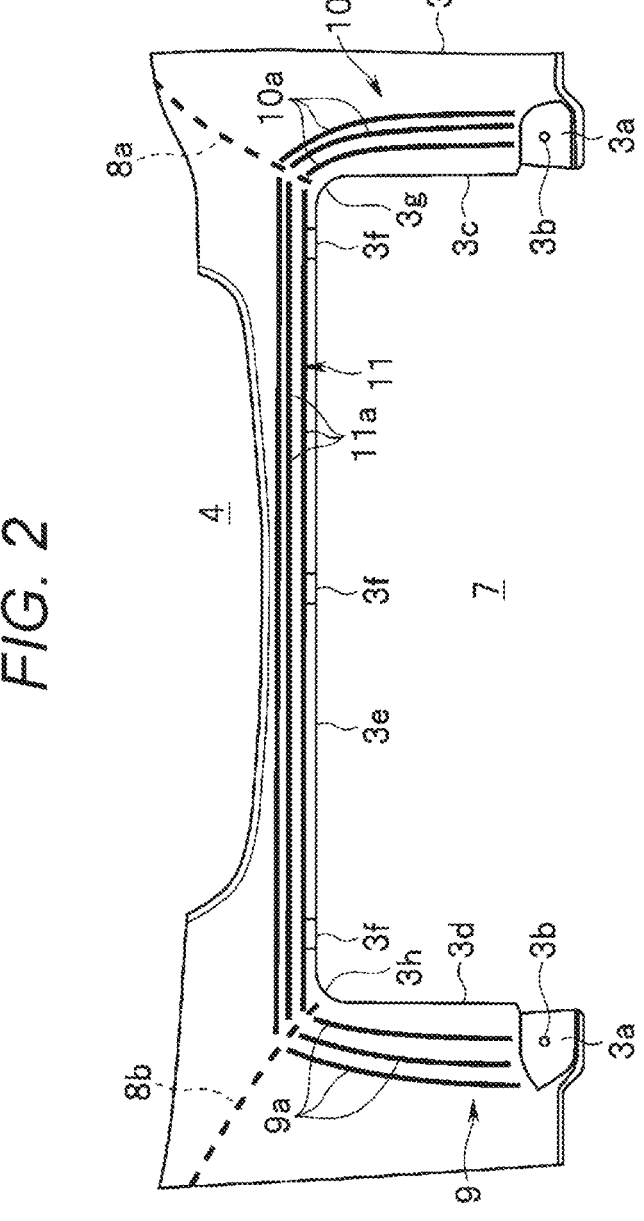
FIG. 2 is a rear view of the lower panel.

FIG. 2 is a rear view of the lower panel 3. The airbag opening 7 is formed by three sides of the lower panel 3, that is, a left first side 3c, a right second side 3d, and an upper third side 3e.

A first folding planned line 8a is provided at a first corner 3g where the first side 3c and the third side 3e of the lower panel 3 intersect with each other. A second folding planned line 8b is provided at a second corner 3h where the second side 3d and the third side 3e of the lower panel 3 intersect with each other.

The both folding planned lines 8a and 8b extend obliquely from the corners 3g and 3h in the upper direction and in directions away from each other. Each of the folding planned lines 8a and 8b is a fragile portion, and is formed by a tear line or a groove portion having a thin plate thickness.

First to third rib portions 9 to 11 are provided on edges of the first to third sides 3c to 3e. Each rib portion 9 to 11 is provided along the edge of each side 3c to 3e. Each rib portion 9 to 11 includes multiple (three in the drawing) ribs 9a, 10a, and 11a substantially parallel to each other.

An upper end of each rib 9a of the first rib portion 9 and a left end of each rib 11a of the third rib portion 11 in FIG. 2 are not crossed and are discontinuous immediately before the first folding planned line 8a. Further, an upper end of each rib 10a of the second rib portion 10 and a right end of each rib 11a of the third rib portion 11 in FIG. 2 are not crossed and are discontinuous immediately before the second folding planned line 8b.

As illustrated in FIG. 1A, a door body 12a of an airbag door 12 is disposed in the airbag opening 7. The door body 12a closes the airbag opening 7. A tear line 12b is provided on a back surface (vehicle front portion) side of the door body 12a. The tear line 12b extends in a horizontal direction at the middle of the airbag door 12 in a vertical direction.

Figure 3A:
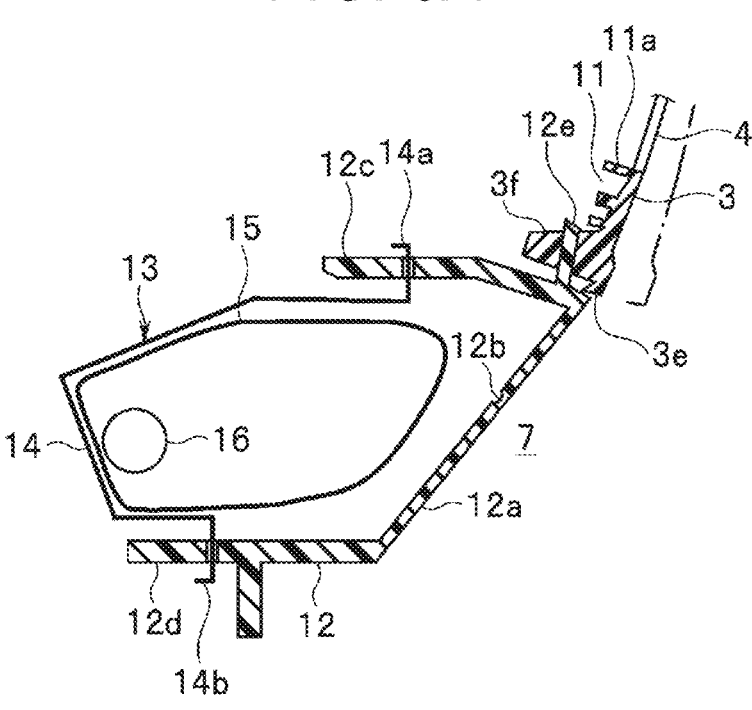
FIG. 3A is a cross-sectional view taken along line A-A in FIG. 1A.

As illustrated in FIG. 3A, a surface of the door body 12a is shaped to be substantially flush with the lower panel 3. Flanges 12c and 12d are permanently affixed to upper and lower rear surfaces of the door body 12a. The flanges 12c and 12d protrude forward of the vehicle body. An engagement claw 12e is provided in the upper flange 12c. The engagement claw 12e protrudes from an upper surface of the upper flange 12c on the door body 12a side. The engagement claw 12e is engaged with an engaging portion 3f provided on a back surface of the lower panel 3.

Although not illustrated, flanges are provided near upper and lower portions of the left and right rear portions of the door body 12a, and engagement claws are provided on the flanges. The engagement claws 12e are engaged with engaging portions provided on back surfaces of the first and second sides 3c and 3d of the airbag opening 7.

A knee airbag module 13 is disposed in front of the door body 12a. The knee airbag module 13 includes a retainer case 14, a knee airbag 15, and an inflator 16.

The retainer case 14 is provided in a box shape in which the door body 12a side is opened. The retainer case 14 is fixed to a vehicle body side reinforcement (not illustrated) disposed in the instrument panel 1. Locking claws 14a and 14b are provided above and below the opening of the retainer case 14. The locking claws 14a and 14b are locked to the upper and lower flanges 12c and 12d and positioned.

The knee airbag 15 is housed in the retainer case 14 in a folded state. The inflator 16 is coupled to the knee airbag 15. The inflator 16 ejects an inflation gas for inflating and deploying the knee airbag 15. The inflator 16 is actuated by a signal when a shock sensing sensor (not illustrated) senses a shock.

Next, the operation of the present embodiment with such a configuration will be described. When the vehicle collides with a three-dimensional obstacle or the like and the impact sensing sensor senses an impact, an inflation gas is ejected from the inflator 16 to the knee airbag 15.

Figure 3B:
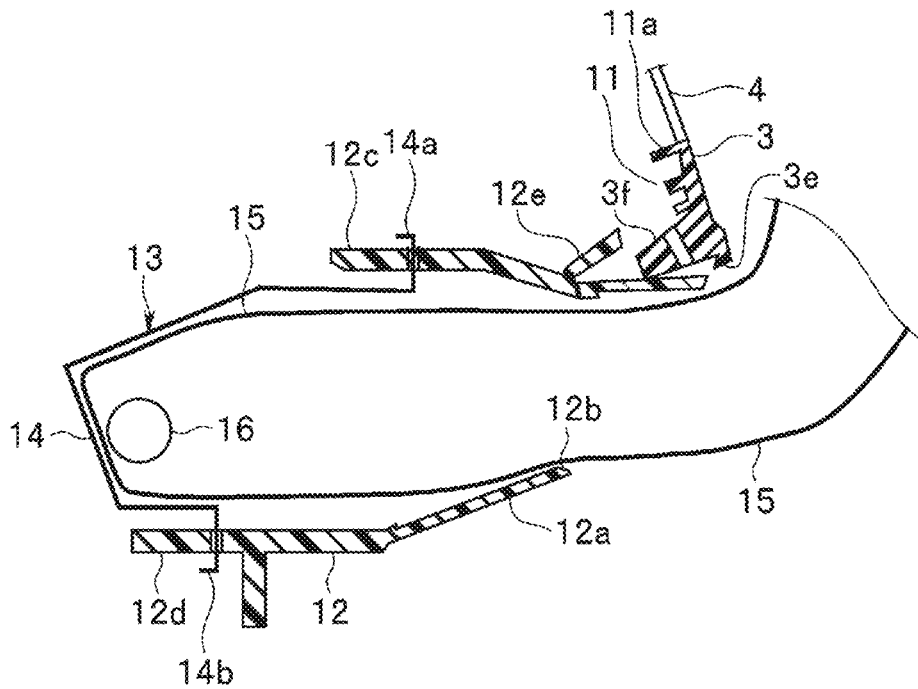
FIG. 3B is a cross-sectional view taken along line B-B in FIG. 1B.

Then, the knee airbag 15 is inflated and deployed in the direction of the door body 12a of the airbag door 12. The door body 12a receives the inflation pressure from the knee airbag 15 and is torn open by the tear line 12b, and as illustrated in FIG. 3B, the door body 12a is divided into two upper and lower flaps, and each of the flaps swings in the vertical direction to open the airbag opening 7. The knee airbag 15 passes through the airbag opening 7 and inflates and develops toward the occupant.

An engagement claw 12e provided around the door body 12a is engaged with an engaging portion 3f provided on the peripheral edge of the airbag opening 7. Therefore, when the inflation pressure of the knee airbag 15 is applied to the door body 12a, the pressure is transmitted to the peripheral edge of the airbag opening 7 via the engagement claw 12e to bend the peripheral edge.

As illustrated in FIG. 2, a first rib portion 9 is provided along the edges of the first and second sides 3c and 3d. Furthermore, the seat surface portion 3a provided at the lower end edges of the first and second sides 3c and 3d is fastened to the reinforcement via a screw. Thus, the first and second sides 3c and 3d do not bend even when receiving the inflation pressure from the knee airbag 15. Therefore, no gap is generated between the edges of the first and second sides 3c and 3d and the door body 12a.

Since the first and second sides 3c and 3d do not bend even when receiving the inflation pressure from the knee airbag 15, the inflation pressure of the knee airbag 15 concentrates on the third side 3e side of the airbag opening 7. The third rib portion 11 is provided at the edge of the third side 3e. Therefore, the edge of the third side 3e is not bent even when receiving the inflation pressure from the knee airbag 15.

As a result, the stress due to the inflation pressure from the knee airbag 15 concentrates on the first corner 3g side of the first side 3c and the third side 3e and the second corner 3h side of the second side 3d and the third side 3e where the rib portions 9 to 11 are discontinuous. In the lower panel 3, the first and second folding planned lines 8a and 8b, which are fragile portions, are provided obliquely in an upper direction from the first and second corners 3g and 3h and in directions away from each other.

Therefore, when the stress concentrates on the first and second corners 3g and 3h, the third side 3e of the lower panel 3 is pressed upward, so that the first and second corners 3g and 3h are bent or deformed along the first and second folding planned lines 8a and 8b. FIG. 1B illustrates a state in which the first and second corners 3g and 3h are bent along the first and second folding planned lines 8a and 8b by the concentration of the stress due to the inflation pressure from the knee airbag 15. However, when the stress concentration due to the inflation pressure from the knee airbag 15 is received, the first and second folding planned lines 8a and 8b may just be partially folded and the remaining portion may just be deformed. Alternatively, the entire first and second folding planned lines 8a and 8b may just be deformed without being folded.

Due to the folding or deformation of the first and second folding planned lines 8a and 8b, as illustrated in FIG. 3B, the upper flap of the door body 12a is swung upward following the inflation and deployment of the knee airbag 15. Thus, the deployment failure of the knee airbag 15 can be prevented in advance. Furthermore, since the first to third sides 3c to 3e of the lower panel forming the airbag opening 7 are not bent, the deployment pressure of the airbag is not attenuated, and the deployment delay can be prevented in advance.

Second Embodiment

Figure 4A:
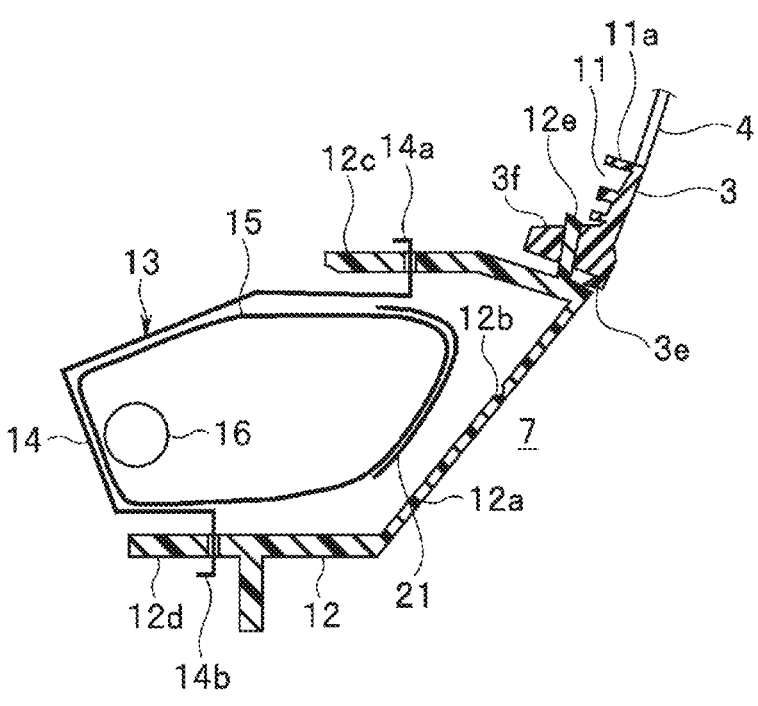
FIG. 4A is a cross-sectional view corresponding to FIG. 3A according to an embodiment.
Figure 4B:
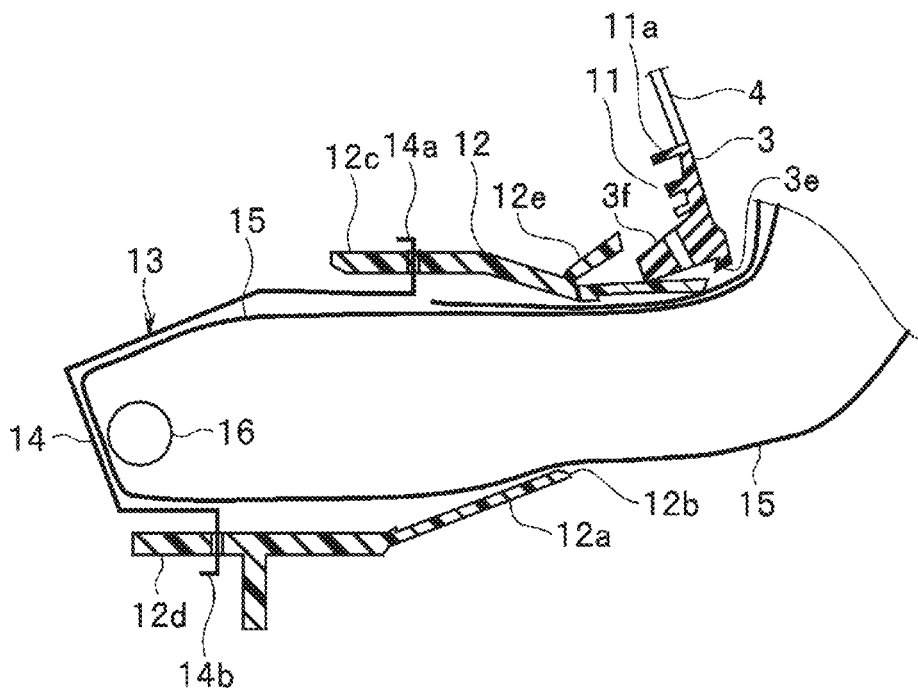
FIG. 4B is a cross-sectional view corresponding to FIG. 3B.

FIGS. 4A and 4B illustrate a second embodiment of the disclosure. The same components as those in the first embodiment are denoted by the same reference numerals, and the description thereof will be omitted or simplified.

In the present embodiment, a cover sheet 21 is attached to the surface of the knee airbag 15 of the first embodiment described above. More specifically, the cover sheet 21 is attached to a position serving as a portion that comes into contact with the upper flap when the knee airbag 15 tears open the door body 12a. The cover sheet 21 is a base cloth, a flexible resin, a film, or the like having flexibility.

According to the present embodiment, as illustrated in FIG. 4B, since the cover sheet 21 is attached to the knee airbag 15, it is deployed together with the cover sheet 21. Therefore, when the knee airbag 15 is inflated and deployed, the cover sheet 21 is not displaced with respect to the knee airbag 15.

The disclosure is not limited to the embodiment described above, and for example, the occupant protection device can be applied to a top-mount type airbag for a passenger seat or a knee airbag on the passenger seat side.

According to the disclosure, since the rib portion is provided at the edge of the airbag opening, the edge is not greatly deflected even when receiving the deployment pressure of the airbag. In addition, since the respective rib portions are not crossed on the first and second corners side and are discontinuous, stress concentrates on the discontinuous portion when the airbag is deployed, and this discontinuous portion can be broken or deformed. As a result, a deployment delay when the airbag is inflated and deployed can be prevented in advance.

The invention claimed is:

1. An occupant protection device comprising:
an airbag
an airbag opening provided in an instrument panel through which the airbag is configured to pass when the airbag is inflated and deployed in a direction of an occupant of a vehicle;
an airbag door configured to close the airbag opening and be torn open when the airbag is inflated and deployed; and an airbag module housed in the airbag door at a portion closer to a front side of a vehicle body of the vehicle, the airbag module comprising the airbag,
wherein the airbag opening comprises a first side, a second side, and a third side, the first side and the second side extending in an upward direction and facing each other, the third side extending in a horizontal direction,
wherein the first side and the third side are continuous at a first corner, and the second side and the third side are continuous at a second corner,
wherein a first rib portion, a second rib portion, and a third rib portion are provided at an edge of each of sides of the instrument panel, and the first rib portion, the second rib portion, and the third rib portion extend along each of the sides,
wherein the first rib portion and the third rib portion of the instrument panel are discontinuous without intersecting each other on the first corner side,
wherein the second rib portion and the third rib portion are discontinuous without intersecting with each other on the second corner side, and
wherein the first rib portion, the second rib portion, and the third rib portion are provided at the edge of each of the sides of the instrument panel on a back surface of the instrument panel.

2. The occupant protection device according to claim 1, wherein a first folding planned line is provided from the first corner side at a portion where the first rib portion and the third rib portion of the instrument panel are discontinuous, and
wherein a second folding planned line is provided from the second corner side at a portion where the second rib portion and the third rib portion of the instrument panel are discontinuous.

3. The occupant protection device according to claim 1, wherein the airbag is a knee airbag, and
wherein the airbag opening is provided in a lower portion of a lower panel provided in the instrument panel.

4. The occupant protection device according to claim 3, wherein lower ends of the first side and the second side of the airbag opening of the instrument panel are fixed to the vehicle body.

5. The occupant protection device according to claim 1, wherein a cover sheet is attached to a surface passing through the third side of the airbag.

6. The occupant protection device according to claim 2, wherein a cover sheet is attached to a surface passing through the third side of the airbag.

7. The occupant protection device according to claim 3, wherein a cover sheet is attached to a surface passing through the third side of the airbag.

8. The occupant protection device according to claim 4, wherein a cover sheet is attached to a surface passing through the third side of the airbag.

9. The occupant protection device according to claim 1, wherein a cover sheet is attached to a position on a surface passing through the third side of the airbag that comes into contact with an upper flap of the airbag door when the airbag tears open the airbag door.

10. The occupant protection device according to claim 1, wherein each of the first rib portion, the second rib portion, and the third rib portion comprises a plurality of ribs that are parallel to each other.

11. The occupant protection device according to claim 2, wherein the first folding planned line and the second folding planned line extend obliquely from the first corner and the second corner, respectively, in an upward direction and in directions away from each other.

12. The occupant protection device according to claim 2, wherein each of the first folding planned line and the second folding planned line is a fragile portion comprising a tear line or a groove having a thin plate thickness.

13. The occupant protection device according to claim 3, wherein a lower end of the airbag opening is open, and a seat surface portion is provided at the lower end of the airbag opening and at lower end edges of the first side and the second side, the seat surface portion including at least one screw insertion hole for fastening to a reinforcement on a vehicle body side.

14. The occupant protection device according to claim 13, wherein the seat surface portion is fastened to the reinforcement via at least one tapping screw inserted into the at least one screw insertion hole.

15. The occupant protection device according to claim 1, wherein the airbag door comprises a door body having a tear line extending in a horizontal direction at a middle of the airbag door in a vertical direction, and wherein the airbag door further comprises flanges with engagement claws engaged with engaging portions on the back surface of the instrument panel.

16. The occupant protection device according to claim 1, wherein the airbag module comprises a retainer case fixed to a reinforcement in the instrument panel, the retainer case having an opening toward the airbag door and including locking claws locked to flanges of the airbag door, and wherein the airbag is housed in a folded state in the retainer case with an inflator coupled thereto.

17. The occupant protection device according to claim 5, wherein the cover sheet comprises a base cloth, a flexible resin, or a film having flexibility, and wherein the cover sheet is configured to deploy with the airbag without displacement relative to the airbag during inflation and deployment.

18. The occupant protection device according to claim 1, wherein, during inflation and deployment of the airbag, stress concentrates at portions where the first rib portion and the third rib portion are discontinuous and where the second rib portion and the third rib portion are discontinuous, causing the instrument panel to bend or deform at the first corner and the second corner without bending edges of the first side, the second side, and the third side.

19. An occupant protection device comprising:

an airbag an airbag opening provided in an instrument panel through which the airbag is configured to pass when the airbag is inflated and deployed in a direction of an occupant of a vehicle;

an airbag door configured to close the airbag opening and be torn open when the airbag is inflated and deployed; and an airbag module housed in the airbag door at a portion closer to a front side of a vehicle body of the vehicle, the airbag module comprising the airbag, wherein the airbag opening comprises a first side, a second side, and a third side, the first side and the second side extending in an upward direction and facing each other, the third side extending in a horizontal direction, wherein the first side and the third side are continuous at a first corner, and the second side and the third side are continuous at a second corner, wherein a first rib portion, a second rib portion, and a third rib portion are provided at an edge of each of sides of the instrument panel, and the first rib portion, the second rib portion, and the third rib portion extend along each of the sides, wherein the first rib portion and the third rib portion of the instrument panel are discontinuous without intersecting each other on the first corner side, wherein the second rib portion and the third rib portion are discontinuous without intersecting with each other on the second corner side, wherein the first rib portion, the second rib portion, and the third rib portion are provided at the edge of each of the sides of the instrument panel on a back surface of the instrument panel, and wherein a cover sheet is attached to a position on a surface passing through the third side of the airbag that comes into contact with an upper flap of the airbag door when the airbag tears open the airbag door.

* * * * *